2 Sheets—Sheet 1.

P. STARR.
Hat Forming Machine Feeder.

No. 230,833. Patented Aug. 3, 1880.

Witnesses Inventor.
Peter Starr
Per Ellsworth A. Smith
Attorney

2 Sheets—Sheet 2.

P. STARR.
Hat Forming Machine Feeder.

No. 230,833. Patented Aug. 3, 1880.

Witnesses: Inventor.
Peter Starr
Per Ellsworth A. Smith
Attorney

UNITED STATES PATENT OFFICE.

PETER STARR, OF DANBURY, CONNECTICUT.

HAT-FORMING-MACHINE FEEDER.

SPECIFICATION forming part of Letters Patent No. 230,833, dated August 3, 1880.

Application filed January 2, 1880.

*To all whom it may concern:*

Be it known that I, PETER STARR, of Danbury, in the county of Fairfield, and State of Connecticut, have invented a new and useful Improvement in Hat-Forming-Machine Feeders, which improvement is fully set forth in the following specification and accompanying drawings, in which—

Figure 1:
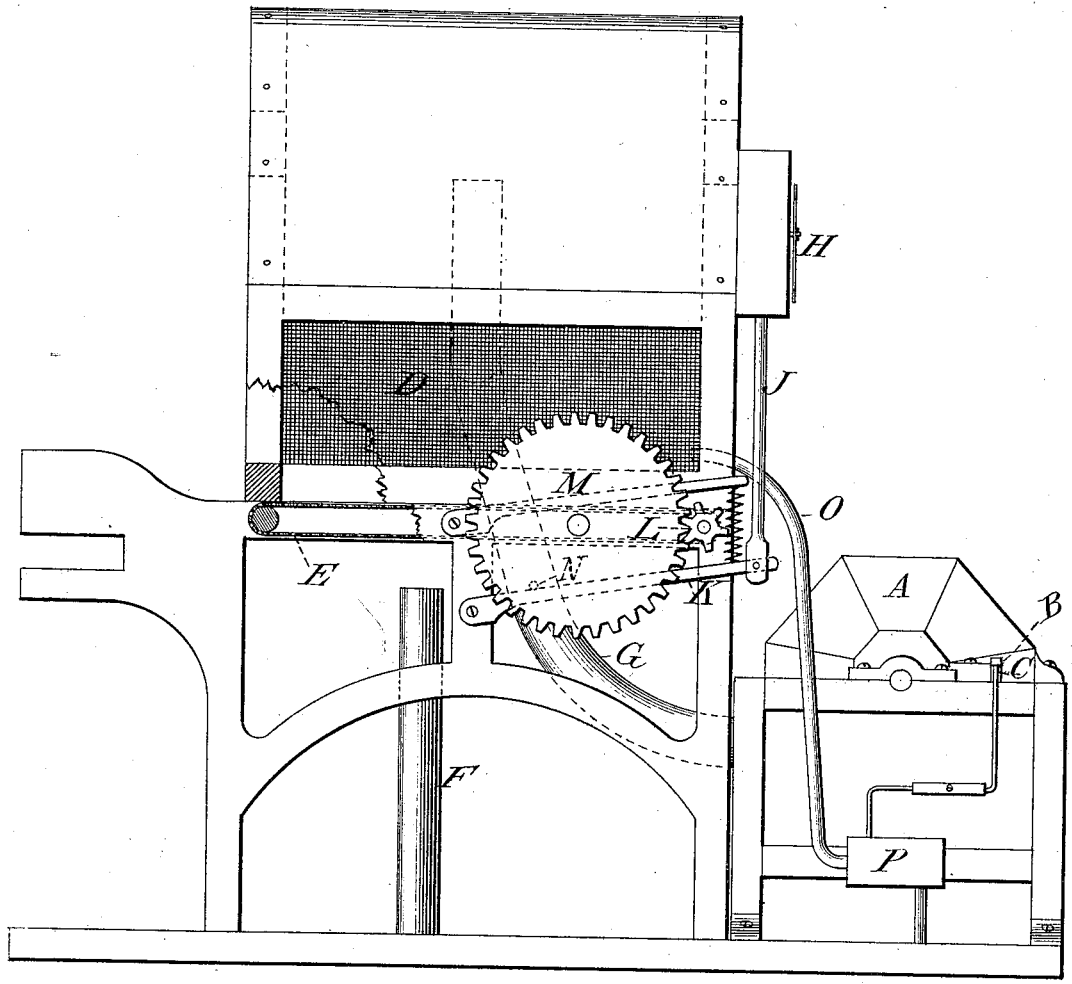
Figure 2:
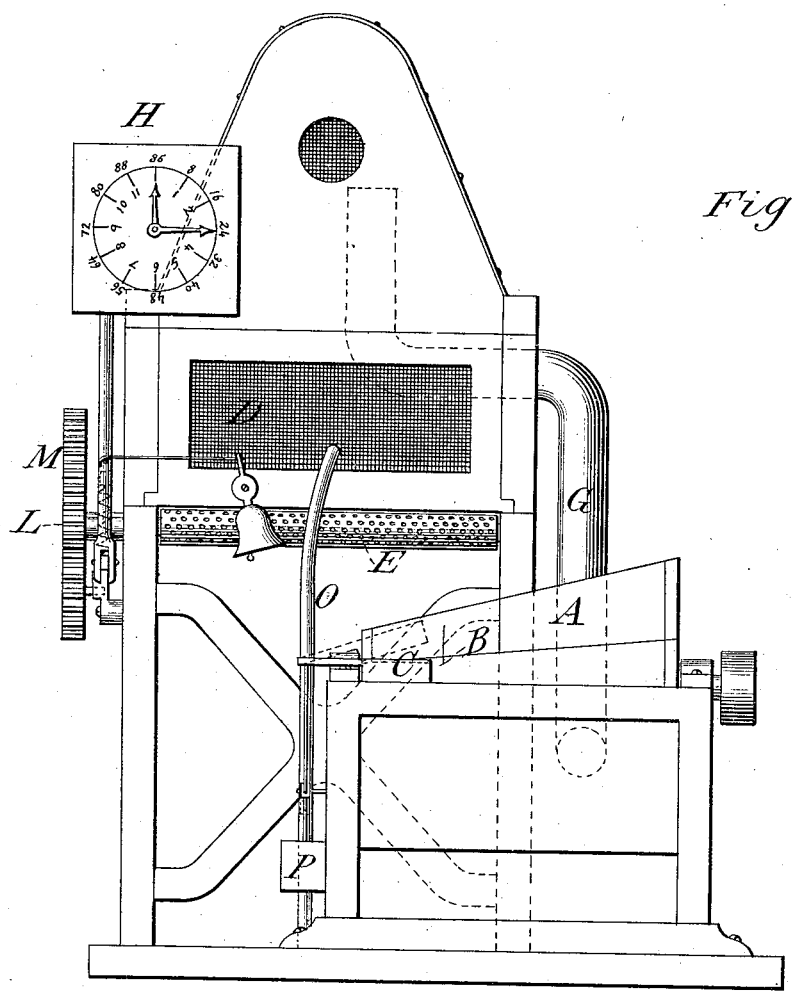

Figure 1 is a side elevation, and Fig. 2 an end view.

The object of my invention is to furnish a device for feeding fur or other material into a hat-forming machine in a uniform and rapid manner and in a light and thoroughly separated condition, and preventing any liability to become lumpy before passing into the forming-machine, which latter is the case in the old manner.

In the drawings, picker and blower A receives the fur in a lumpy and matted state at entrance B, at which entrance is gate C to control the amount of air entering picker and blower in connection with the fur or other stock, also to cut off the supply instantly when necessary after the fur is sufficiently picked and separated to be received into the forming-machine.

D is a receiving-chamber for the fur that is driven from blower and picker A, at the bottom and inside of which chamber is perforated apron E, made of wire-cloth or of slats of metal or wood, or any suitable material made in a flexible manner, to admit of its running easily over the rollers provided for the apron to run upon.

At the bottom of chamber D is pipe F, connected with the exhaust of the forming-machine, to cause the air in the chamber to become exhausted, thereby insuring the fur to be more quickly and evenly settled and distributed on the apron before it passes along into the forming-machine.

G is a pipe or conductor connecting picker A with chamber D at a suitable distance from the top of the chamber, to cause the fur to be blown to the top of the chamber by a curve in pipe G after the pipe has entered chamber D.

Chamber D is constructed of a frame-work in size and shape to conform to requirements necessary in supplying a forming-machine, with sides and ends covered with wire-cloth or other open work, whereby a sufficient allowance of air-current may be obtained to cause the fur to settle readily on apron E.

H is an indicator or register, operated by rod or piston J, which rod or piston is made to work in unison with lever K, which lever is fastened to the bed-frame of the supporting-table.

L is a gear-wheel pinned to the shaft of the apron-roller, which gear-wheel L meshes into gear-wheel M.

Gear-wheel M is provided with projection or pin N, placed thereon for the purpose of operating at each revolution of the gear-wheel against lever K, causing it to be pulled down sufficiently to allow indicator H to register each revolution of the apron over the rollers, which registers each hat-body that is formed.

Indicator or register H is also constructed with dial-plate, pointers, and figures to indicate the number of hats formed each day.

While my invention can be used to advantage on any of the old style of forming-machines, I prefer to apply it to my hat-forming-machine feeder, patented October 1, 1878, and numbered 208,545.

To prevent any tendency that the fur or other stock may have to settle too suddenly and to insure falling in a light condition, I have placed blow-pipe O, running from air-chamber P to receiving-chamber D, to form a counter-current in the receiving-chamber, which causes the fur to settle more lightly upon the apron.

Air-chamber P is provided with a regulator acting in unison with gate C to shut off the force of air in the blow-pipe when the stock is passing from the picker and blower to the receiving-chamber.

Air-chamber P is supplied with air forced from a blower connected at the end of the shaft of the picker, or at any other convenient place where power can be obtained.

Having thus described my invention, what I claim as new, and desire to secure by Letters Patent, is—

1. Indicator or register H, operated automatically with apron E by connecting rod or piston, substantially as shown and described.

2. Perforated apron E, made of any suitable flexible material, substantially as and for the purposes set forth.

3. Blow-pipe O, in combination with air-chamber P and regulator acting in unison with gate C, substantially as shown and described, and for the purposes set forth.

PETER STARR. [L. S.]

Witnesses:
ELLSWORTH A. SMITH,
JABEZ AMSBURY.